United States Patent
Verma et al.

(10) Patent No.: US 12,273,263 B1
(45) Date of Patent: Apr. 8, 2025

(54) SYSTEMS AND METHODS FOR ENABLING PRECISION TIME PROTOCOL OVER A LINK AGGREGATION GROUP USING LINK AGGREGATION CONTROL PROTOCOL PARAMETERS

(71) Applicant: Juniper Networks, Inc., Sunnyvale, CA (US)

(72) Inventors: Amit Verma, Bangalore (IN); Satheesh Kumar S, Bangalore (IN); Sharath Kaggundi, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/338,047

(22) Filed: Jun. 20, 2023

(51) Int. Cl.
*G06F 15/16* (2006.01)
*H04L 45/24* (2022.01)
*H04L 45/42* (2022.01)

(52) U.S. Cl.
CPC .......... *H04L 45/245* (2013.01); *H04L 45/42* (2013.01)

(58) Field of Classification Search
CPC .................................................. H04L 45/245
See application file for complete search history.

(56) References Cited

U.S. PATENT DOCUMENTS

| | | | |
|---|---|---|---|
| 2014/0025736 A1* | 1/2014 | Wang ..................... | H04L 45/245 709/204 |
| 2014/0314095 A1* | 10/2014 | Saltsidis ............... | H04L 45/245 370/394 |
| 2015/0323940 A1* | 11/2015 | Venkatesan ........ | G05D 23/1917 700/300 |
| 2016/0014032 A1* | 1/2016 | Ao ........................ | H04L 47/125 370/236 |
| 2016/0065322 A1* | 3/2016 | Cao ....................... | H04J 3/0658 370/503 |
| 2016/0094436 A1* | 3/2016 | Elder .................... | H04L 45/245 370/225 |
| 2016/0105306 A1* | 4/2016 | Wu ......................... | H04L 47/10 370/221 |
| 2017/0063672 A1* | 3/2017 | Chhabra ............. | H04L 41/0663 |
| 2019/0356403 A1* | 11/2019 | V.K. ........................ | H04L 41/12 |
| 2020/0328982 A1* | 10/2020 | Gopalarathnam ...... | H04L 47/41 |
| 2021/0111978 A1* | 4/2021 | Zheng ................. | H04L 41/0631 |
| 2022/0021586 A1* | 1/2022 | Kazmierski ......... | H04L 67/1004 |

\* cited by examiner

*Primary Examiner* — Hieu T Hoang
(74) *Attorney, Agent, or Firm* — Harrity & Harrity, LLP (57) ABSTRACT

A network device may identify a link aggregation group (LAG) of a plurality of links between the network device and another network device. The network device may identify link aggregation control protocol (LACP) parameters that were communicated by the network device and the other network device in association with the LAG. The network device may determine, based on the LACP parameters, a priority order of the plurality of links in the LAG. The network device may communicate with the other network device, and based on the priority order of the plurality of links of the LAG, one or more precision time protocol (PTP) messages via the LAG. For example, the network device may determine that a first link and a second link in the priority order are not available, and therefore may communicate the one or more PTP messages via a third link in the priority order.

20 Claims, 8 Drawing Sheets

Example Data Structure for LACP Parameters

| Link | Network Device 1 Port Key | Network Device 1 Port Number | Network Device 1 Port Priority | Network Device 2 Port Key | Network Device 2 Port Number | Network Device 1 Port Priority |
|---|---|---|---|---|---|---|
| 1 | a | b | N | x | y | N |
| 2 | a | b + 1 | 1 | x | y + 1 | 2 |
| ⋮ | ⋮ | ⋮ | ⋮ | ⋮ | ⋮ | ⋮ |
| N | a | b + N - 1 | 2 | x | y + N - 1 | 1 |

SYSTEMS AND METHODS FOR ENABLING PRECISION TIME PROTOCOL OVER A LINK AGGREGATION GROUP USING LINK AGGREGATION CONTROL PROTOCOL PARAMETERS

BACKGROUND

Precision Time Protocol (PTP) may be used to synchronize clocks associated with network devices in a network. When used, PTP may be capable of achieving sub-microsecond clock accuracy.

SUMMARY

In some implementations, a method includes identifying, by a network device, a link aggregation group (LAG) of a plurality of links between the network device and another network device; identifying, by the network device, link aggregation control protocol (LACP) parameters that were communicated by the network device and the other network device in association with the LAG; determining, by the network device and based on the LACP parameters, a priority order of the plurality of links in the LAG; and communicating, by the network device, with the other network device, and based on the priority order of the plurality of links of the LAG, one or more PTP messages via the LAG.

In some implementations, a non-transitory computer-readable medium storing a set of instructions includes one or more instructions that, when executed by one or more processors of a network device, cause the network device to: identify LACP parameters associated with a LAG of a plurality of links between the network device and another network device; determine, based on the LACP parameters, a priority order of the plurality of links of the LAG; and communicate with the other network device, and based on the priority order of the plurality of links of the LAG, one or more PTP messages via the LAG.

In some implementations, a network device includes one or more memories, and one or more processors to: determine, based on LACP parameters associated with a LAG of a plurality of links, a priority order of the plurality of links of the LAG; and communicate, based on the priority order of the plurality of links of the LAG, one or more PTP messages via the LAG.

DETAILED DESCRIPTION

The following detailed description of example implementations refers to the accompanying drawings. The same reference numbers in different drawings may identify the same or similar elements.

In some networks, a first network device and a second network device may perform PTP communications. PTP communications may include an exchange of various types of PTP packets to synchronize a clock associated with the first network device and a clock associated with the second network device, and to maintain the synchronization.

PTP communications typically established between, the first network device referred as a Master Clock (sometimes referred as a Primary) and the second network device referred as a Slave (sometimes referred as a Secondary). Accordingly, the clock associated with the second network device may synchronize to the clock associated with the first network device.

In some cases, the first network device may be connected to the second network device over a plurality of links. For example, the first network device and the second network device may each have two or more ports connected to each other, such as port P1 and port P2 of the first network device that are connected to port P1 and port P2 of the second network device over two links, link P1-P1 and link P2-P2. The plurality of links may be aggregated into a link aggregation group (LAG) to increase throughput (e.g., by allowing data to be transmitted simultaneously over the plurality of links), provide redundancy (e.g., data may be transmitted over a primary link and switched over to a secondary link if a fault in the primary link occurs), and/or increase reliability (e.g., by balancing traffic on the plurality of links), among other examples.

The first network device and the second network device may be configured to perform PTP communications via the LAG. For example, the first network device and the second network device may each be configured (e.g., by a user such as a network administrator, a network operator, and/or the like) to perform the PTP communications using LAG with member ports designated as a primary port, a secondary port, and the like. In some cases PTP communications switch over to a secondary port if a link associated with the primary port experiences a fault. However, since the first network device and the second network device are configured independently (i.e., the first network device is configured without regard to the configuration of the second network device, and vice-versa), there is no guarantee that ports, associated with a same link of the LAG, on each network device will be selected as primary ports. For example, port P1 on the first network device may be selected as the primary port of the first network device and port P2 on the second network device may selected as the primary port on the second network device. As a result, the first network device may transmit PTP communications on link P1-P1, while the second network device may transmit PTP communications on link P2-P2. Such misconfiguration can cause incorrect working of PTP, which can lead to clock synchronization errors.

The clock synchronization errors can also occur due to asymmetric propagation delays because link P1-P1 may have a different propagation delay than link P2-P2. This can occur, for example, where link P1-P1 and link P2-P2 are cables that have different physical lengths. In some cases, the propagation delay for a cable, such as an optical fiber cable, may be around 4 ns for every 1 meter of cable length. Accordingly, if link P1-P1 is an optical fiber cable having a length of 10,000 meters, and link P2-P2 is an optical fiber cable having a length of 10,100 meters (a 1% difference in length), the difference in propagation delay between link P1-P1 and link P2-P2 may be estimated as around 400 ns. Since a round-trip time calculation assumes that the propagation delay from the first network device to the second network device and the propagation delay from the second network device to the first network device are the same or substantially similar, the asymmetric propagation delay between link P1-P1 and link P2-P2 will result in PTP Time Error. This may cause the second network device to move out of phase and/or out of frequency synchronization relative to the first network device, which may result in user devices of the network experiencing issues, such as dropped calls, interruptions in data streaming, and loss of connections to application servers, and/or the like.

Further, in many cases, a network device can be configured (e.g., manually configured) with participating member ports that are specified as Primary and Secondary for the respective links of a LAG for PTP communications, even if the network device has more ports available that are associated with links of the LAG. Consequently, when both the primary port and the secondary port experiences faults, the network device cannot switch over to another port associated with a link of the LAG to perform the PTP communications. Without PTP communications being exchanged between the first network device and the second network device, the second network device can move out of phase and/or out of frequency synchronization relative to the first network device, which results in the issues described above.

Some implementations described herein include a first network device and a second network device. The network devices may exchange LACP messages in association with establishing and/or maintaining a LAG of a plurality of links between the first network device and the second network device. In this way, the first network device and the second network device may identify LACP parameters (e.g., that were exchanged via the LACP messages) that are associated with the LAG. The LACP parameters may include, for example, first port numbers (e.g., of ports of the first network device), first port key identifiers (e.g., that indicate that the ports of the first network device are associated with the LAG), and first port priorities (e.g., for the ports of the first network device), and may include second port numbers (e.g., of ports of the second network device), second port key identifiers (e.g., that indicate that the ports of the second network device are associated with the LAG), and/or second port priorities (e.g., for the ports of the second network device).

The first network device and the second network device may each determine (e.g., independently determine) a priority order of the plurality of links of the LAG based on the LACP parameters. For example, when the first device is a PTP Master network device and the second device is PTP Slave network device, each network device may determine the LACP state and role information for each links associated with the PTP LAG communication. Each network device refers to itself as an Actor and to the device at the other end of the link as its Partner. LACP can compare the Partner's Partner information with its own state to compare that the Partner has received the Actor's information correctly. During this, LACP discovers some of the parameters of the Actors and Partners such as Port Number, Port Key, Port Priorities and the like on both ends of the Link. Based on the LACP parameters, the first network device that are associated with links of the LAG, may determine a sequence (e.g., an ascending order sequence) of the plurality of the LACP port parameters, and may thereby determine the port priority order of the plurality of links of the LAG. The port priority order is user configurable. Alternatively, each network device may determine first port priorities of the ports of the first network device, may determine a sequence (e.g., in an ascending order of the first port priorities) of the plurality of first port number, and may thereby determine the priority order of the plurality of links of the LAG (e.g., the plurality of links prioritized in the order of the sequence of the plurality of first port number).

The first network device and the second network device then communicate PTP messages via the LAG based on the priority order of the plurality of links. For example, the first network device and the second network device may communicate the PTP messages via a first priority link of the LAG, and then, when the first link fails, may communicate the PTP messages via a second priority link of the LAG, and then, when the second link fails, may communicate the PTP messages via a third priority link of the LAG, and so on.

In this way, the first network device and the second network device each determine the same priority order of the plurality of links of the LAG, which prevents, or at least decreases a likelihood of, the first network device and the second network device communicating PTP messages via different links of the LAG. This reduces a likelihood of asymmetric propagation delay (e.g., because the PTP messages are communicated via the same link of the LAG), which reduces a likelihood of clock synchronization error between the first network device and the second network device. This therefore reduces a likelihood that user devices of a network (e.g., that includes the first network device and the second network device) experience issues, such as dropped calls, interruptions in data streaming, and loss of connections to application servers, among other examples.

Further, implementations described herein enable PTP over a LAG without additional messages (e.g., beyond LACP messages) being communicated between the first network device and the second network device. For example, because the first network device and the second network device are each able to determine the same priority order of the plurality of links of the LAG based on already communicated LACP parameters, no additional messaging is needed between the network devices. This therefore conserves computing resources (e.g., processing resources, memory resources, communication resources, and/or power resources, among other examples) of the first network device and the second network device that would otherwise need to be consumed if one network device were in charge of determining the priority order and informing (e.g., via messaging) the other network device of the priority order.

Additionally, some implementations described herein enable more than just a primary link and a secondary link to be identified in the priority of the plurality of links of the LAG. Accordingly, the first network device and the second network device may continue to communicate PTP messages via the LAG (e.g., using one or more links with a tertiary priority or greater) when the primary link and the secondary link fail, which increases a likelihood that the first network device and the second network device will remain synchronized. Notably, the number of links PTP will use is limited to the scale limit of the PTP slave that are supported on the first and second networking devices.

FIGS. 1A-1D are diagrams of an example implementation 100 associated with enabling PTP over a LAG using LACP parameters. As shown in FIGS. 1A-1D, example implementation 100 includes a first network device (shown as network device 1) and a second network device (shown as network device 2). These devices are described in more detail below in connection with FIGS. 2-4.

The first network device and the second network device may be connected via a LAG that includes a plurality of links. For example, as shown in FIGS. 1A-1D, the first network device and the second network device may be connected via a LAG that includes links 1 through N (where N≥3). In some implementations, the LAG may be an aggregated Ethernet LAG that includes a plurality of Ethernet links.

Figure 1A:
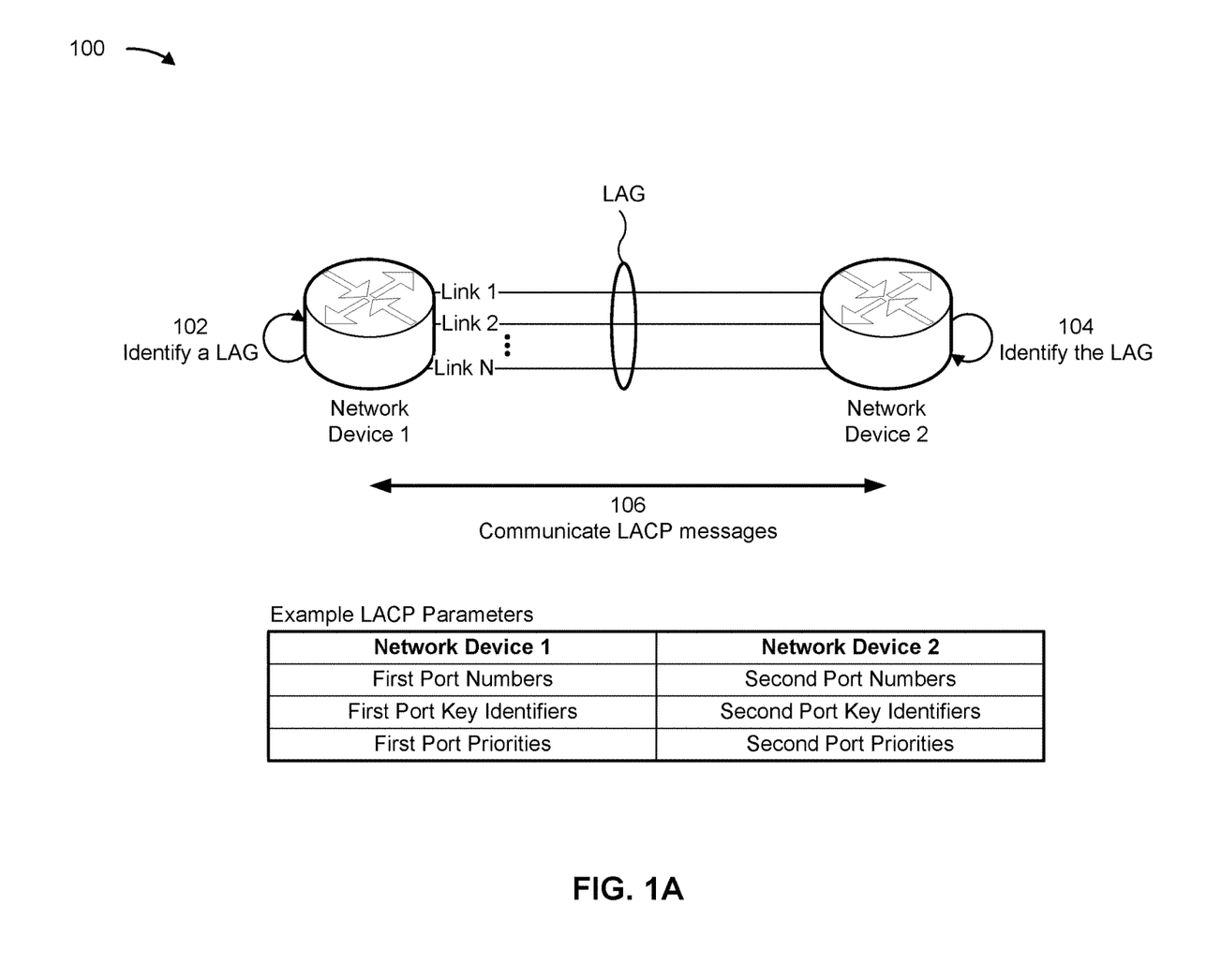
FIGS. 1A-1D are diagrams of an example implementation associated with enabling PTP over a LAG using link aggregation control protocol (LACP) parameters.

As shown in FIG. 1A, and by reference number 102, the first network device may identify the LAG, and, as shown by reference number 104, the second network device may identify the LAG. For example, as shown by reference number 106, the first network device and the second may communicate LACP messages to establish and/or maintain the LAG. Accordingly, based on communicating the LACP messages, the first network device and the second network device may each identify the LAG.

In some implementations, the first network device may send, to the second network device, respective first LACP messages via the plurality of links of the LAG, and the second network device may send, to the first network device, respective second LACP messages via the plurality of links of the LAG. A first LACP message may include, for example, one or more first LACP parameters. The one or more first LACP parameters may include, for example, a first port number that indicates a port of the first network device (e.g., that is associated with the link on which the first LACP message is sent), a first port key identifier that indicates the LAG (e.g., that indicates that the port of the first network device is associated with the LAG), and/or a first port priority that indicates an importance, or other characteristic, of the port of the first network device (e.g., based on configuration information of the first network device). A second LACP message may include, for example, one or more second LACP parameters. The one or more second LACP parameters may include, for example, a second port number that indicates a port of the second network device (e.g., that is associated with the link on which the second LACP message is sent), a second port key identifier that indicates the LAG (e.g., that indicates that the port of the second network device is associated with the LAG), and/or a second port priority that indicates an importance, or other characteristic, of the port of the second network device (e.g., based on configuration information of the second network device).

In this way, the first network device and the second network device may exchange LACP parameters (e.g., sets of one or more first LACP parameters and sets of one or more second LACP parameters) that are associated with the LAG. For example, as shown in FIG. 1A, the LACP parameters may include first port numbers, first port key identifiers, and first port priorities for ports of the first network device associated with the LAG, and may include second port numbers, second port key identifiers, and second port priorities for ports of the second network device associated with the LAG.

Figure 1B:
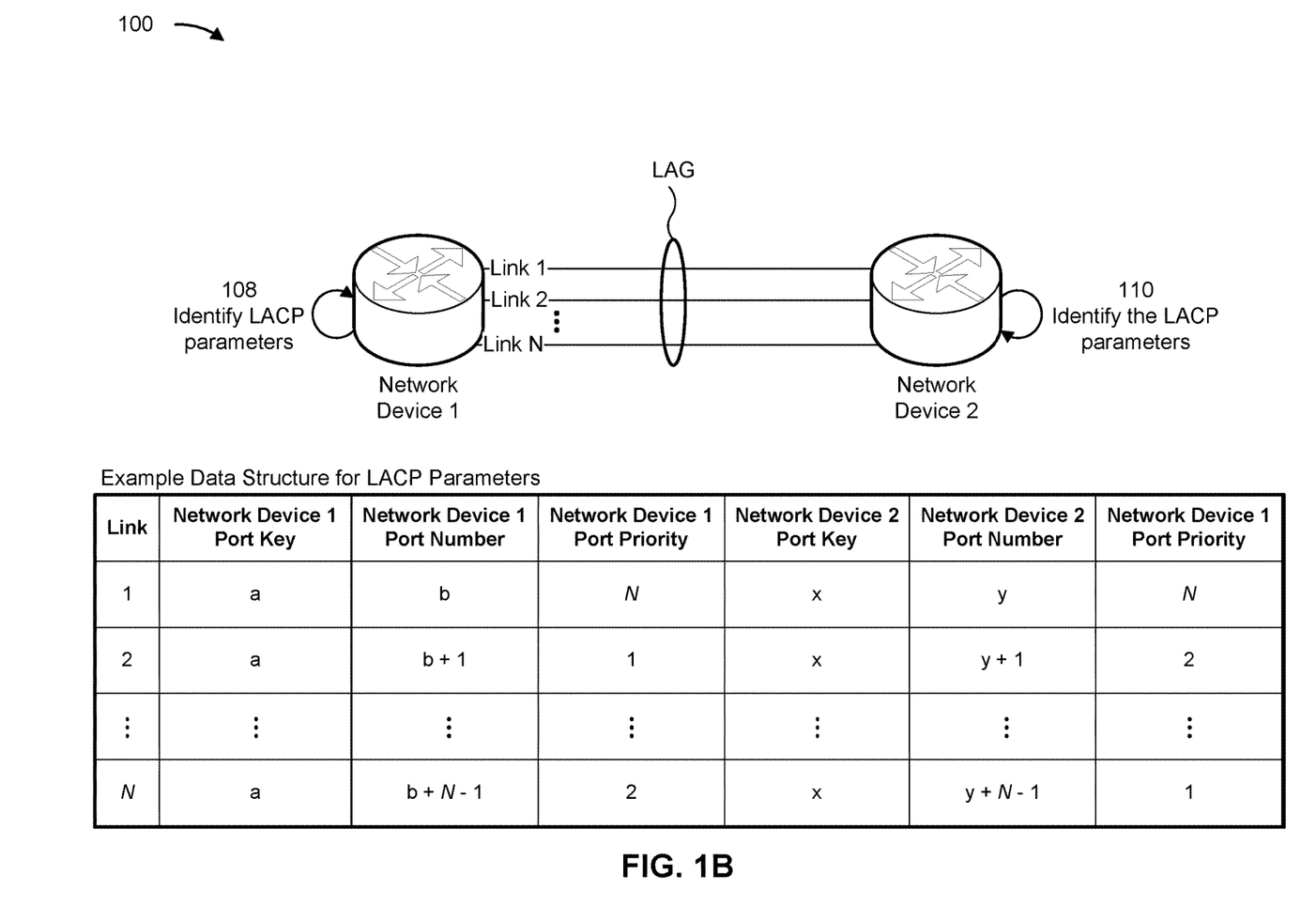

In some implementations, each of the of the first network device and the second network device may store the LACP parameters in respective data structures (e.g., respective databases, tables, files, or other types of data structures). For example, as shown in FIG. 1B, the first network device and the second network device may each store the LACP parameters in a data structure, where an entry of the data structure is associated with each link of the LAG. An entry may indicate the link, a first port key identifier (shown as "Network Device 1 Port Key"), a first port number (shown as "Network Device 1 Port Number"), a first port priority (shown as "Network Device 1 Port Priority"), a second port key identifier (shown as "Network Device 2 Port Key"), a second port number (shown as "Network Device 2 Port Number"), and/or a second port priority (shown as "Network Device 2 Port Priority").

As shown by reference number 108, the first network device may identify the LACP parameters, and as shown by reference number 110, the second network device may identify the LACP parameters. For example, the first network device and the second network device may each process (e.g., parse and/or read) their respective data structures to identify the LACP parameters associated with the LAG.

Figure 1C:
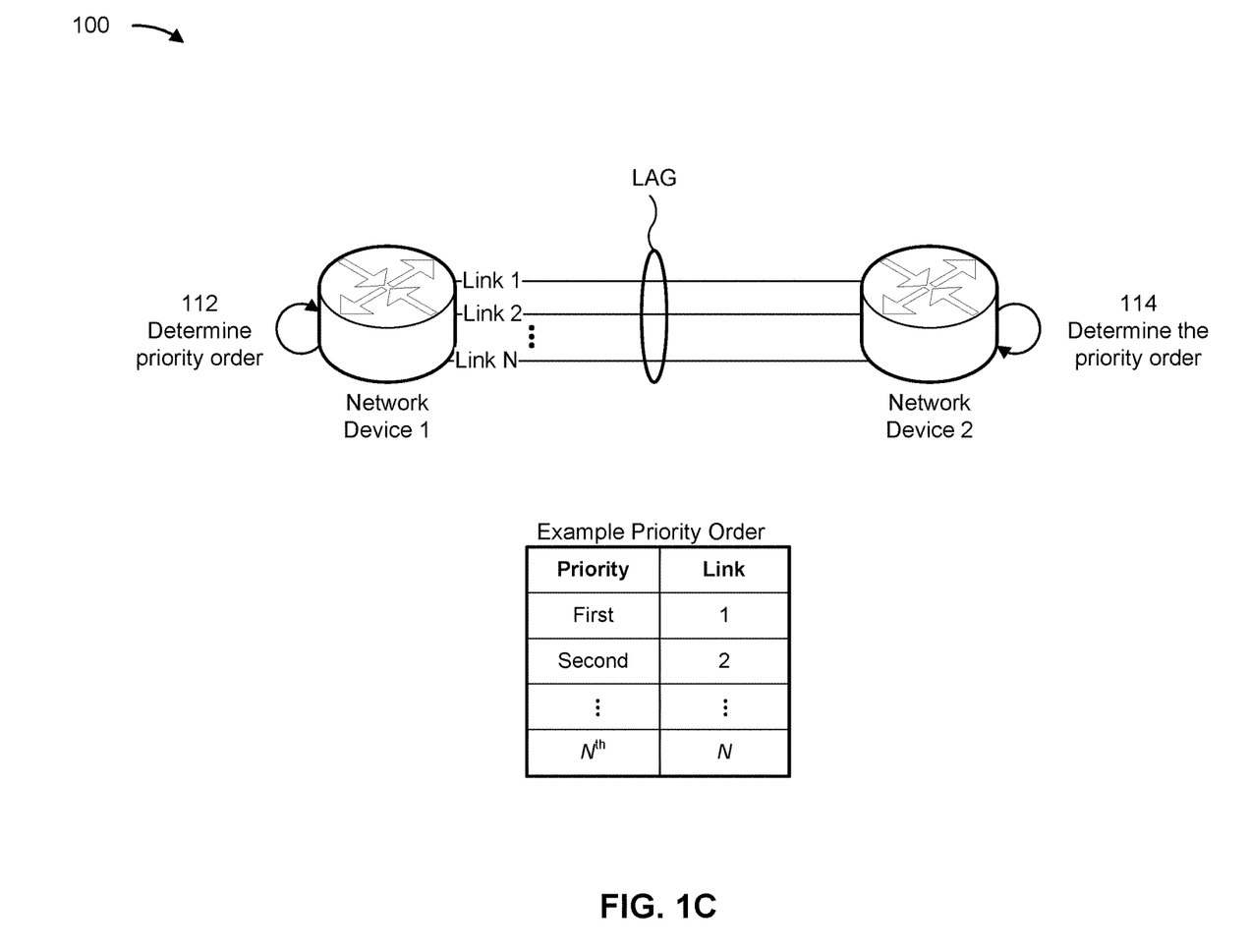

As shown in FIG. 1C, and by reference number 112, the first network device may determine a priority order of the plurality of links of the LAG, and as shown by reference number 114, the second network device may determine the priority order of the plurality of links of the LAG. The priority order of the plurality of links may identify a particular priority for each link of the plurality of links of the LAG. For example, as shown in FIG. 1C, the priority order may identify a first priority (e.g., a primary priority), a second priority (e.g., a secondary priority), a third priority (e.g., a tertiary priority), and so on (e.g., up to an $N^{th}$ priority) for each link of the plurality of links of the LAG.

In some implementations, to determine the priority order of the plurality of links of the LAG, a network device (e.g., of the first network device and the second network device), may identify (e.g., based on the LACP parameters) a port key identifier that indicates the LAG, and may identify (e.g., based on the LACP parameters and port key identifier), a plurality of port numbers (e.g., that indicate a plurality of ports of the network device that are respectively associated with the plurality of links of the LAG). The network device then may determine (e.g., using a sorting technique) a sequence of the plurality of port numbers, and thereby may determine (e.g., based on the sequence of the plurality of port numbers) the priority order of the plurality of links of the LAG.

For example, when the first network device is a primary PTP network device and the second network device is a secondary PTP network device, each network device may identify a first port key identifier (e.g., originated by the first network device, such as "a" shown in FIG. 1B) associated with the LAG, a plurality of first port numbers (e.g., originated by the first network device, such as port numbers "b" through "b+N−1" shown in FIG. 1B) associated with the first port key identifier, may determine a sequence (e.g., an ascending order sequence) of the plurality of first port numbers, and may thereby determine the priority order of the plurality of links of the LAG (e.g., the plurality of links prioritized in the order of the sequence of the plurality of first port numbers, as shown in FIG. 1C). As another example, when the second network device is a primary PTP network device and the first network device is a secondary PTP network device, each network device may identify a second port key identifier (e.g., originated by the second network device, such as "x" shown in FIG. 1B) associated with the LAG, a plurality of second port numbers (e.g., originated by the second network device, such as port numbers "y" through "y+N−1" shown in FIG. 1B) associated with the second port key identifier, may determine a sequence (e.g., an ascending order sequence) of the plurality of second port numbers, and may thereby determine the priority order of the plurality of links of the LAG (e.g., the plurality of links prioritized in the order of the sequence of the plurality of second port numbers, as shown in FIG. 1C).

In some implementations, to determine the priority order of the plurality of links of the LAG, a network device (e.g., of the first network device and the second network device)

may identify (e.g., based on the LACP parameters) a port key identifier that indicates the LAG, and may identify (e.g., based on the LACP parameters and port key identifier) a plurality of port numbers (e.g., that indicate a plurality of ports of the network device that are respectively associated with the plurality of links of the LAG). Additionally, the network device may identify a plurality of port priorities (e.g., that indicate respective priorities of the plurality of ports). The network device then may determine (e.g., based on the plurality of port priorities that indicate respective priorities of the plurality of ports of the network device) a sequence of the plurality of port numbers, and thereby may determine (e.g., based on the sequence of the plurality of port numbers) the priority order of the plurality of links of the LAG.

For example, when the first network device is a primary PTP network device and the second network device is a secondary PTP network device, each network device may identify a first port key identifier (e.g., originated by the first network device, such as "a" shown in FIG. 1B) associated with the LAG, may identify a plurality of first port numbers (e.g., originated by the first network device, such as port numbers "b" through "b+N−1" shown in FIG. 1B) associated with the first port key identifier, may identify a plurality of first port priorities (e.g., originated by the first network device, such as port priorities "1" through "N" shown in FIG. 1B), may determine a sequence (e.g., in an ascending order of the first port priorities) of the plurality of first port numbers, and may thereby determine the priority order of the plurality of links of the LAG (e.g., the plurality of links prioritized in the order of the sequence of the plurality of first port numbers). As another example, when the second network device is a primary PTP network device and the first network device is a secondary PTP network device, each network device may identify a second port key identifier (e.g., originated by the second network device, such as "x" shown in FIG. 1B) associated with the LAG, may identify a plurality of second port numbers (e.g., originated by the second network device, such as port numbers "y" through "y+N−1" shown in FIG. 1B) associated with the second port key identifier, may identify a plurality of second port priorities (e.g., originated by the second network device, such as port priorities "1" through "N" shown in FIG. 1B), may determine a sequence (e.g., in an ascending order of the second port priorities) of the plurality of second port numbers, and may thereby determine the priority order of the plurality of links of the LAG (e.g., the plurality of links prioritized in the order of the sequence of the plurality of second port numbers).

Figure 1D:
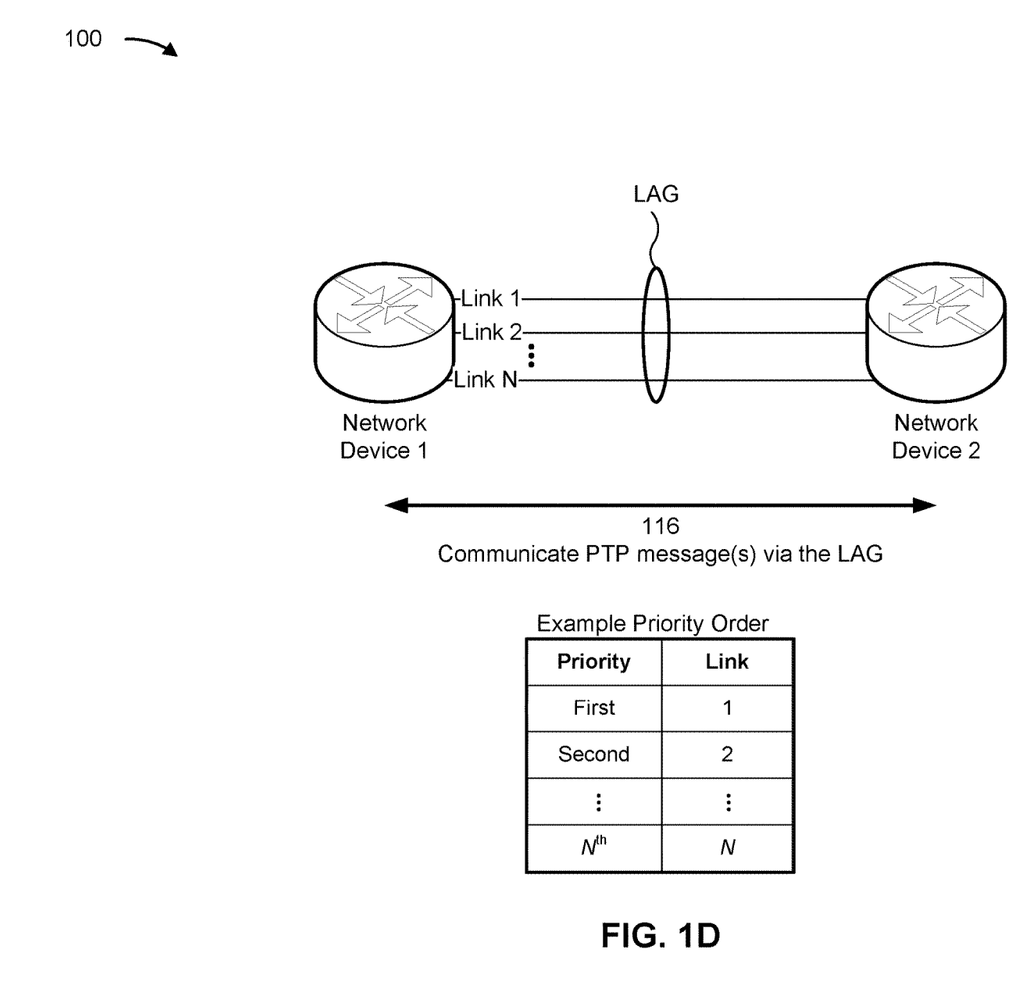

As shown in FIG. 1D, and by reference number 116, the first network device and the second network device may communicate one or more PTP messages via the LAG, based on the priority order of the plurality of links of the LAG. For example, the first network device and the second network device may communicate the one or more PTP messages via a first link, of the plurality of links of the LAG, with a first priority (e.g., a primary priority) in the priority order. As another example, when the first link fails, each of the first network device and the second network device may determine that the first link is not available, may determine that a second link, of the plurality of links, with a second priority (e.g., a secondary priority) in the priority order is available, and may therefore communicate the one or more PTP messages via the second link. As another example, when the first link fails and the second link fails, each of the first network device and the second network device may determine that the first link is not available, may determine that the second link is not available, may determine (e.g., based on determining that the first link is not available and the second link is not available), that a third link, of the plurality of links, with a third priority (e.g., a tertiary priority) in the priority order is available, and may therefore communicate the one or more PTP messages via the third link.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
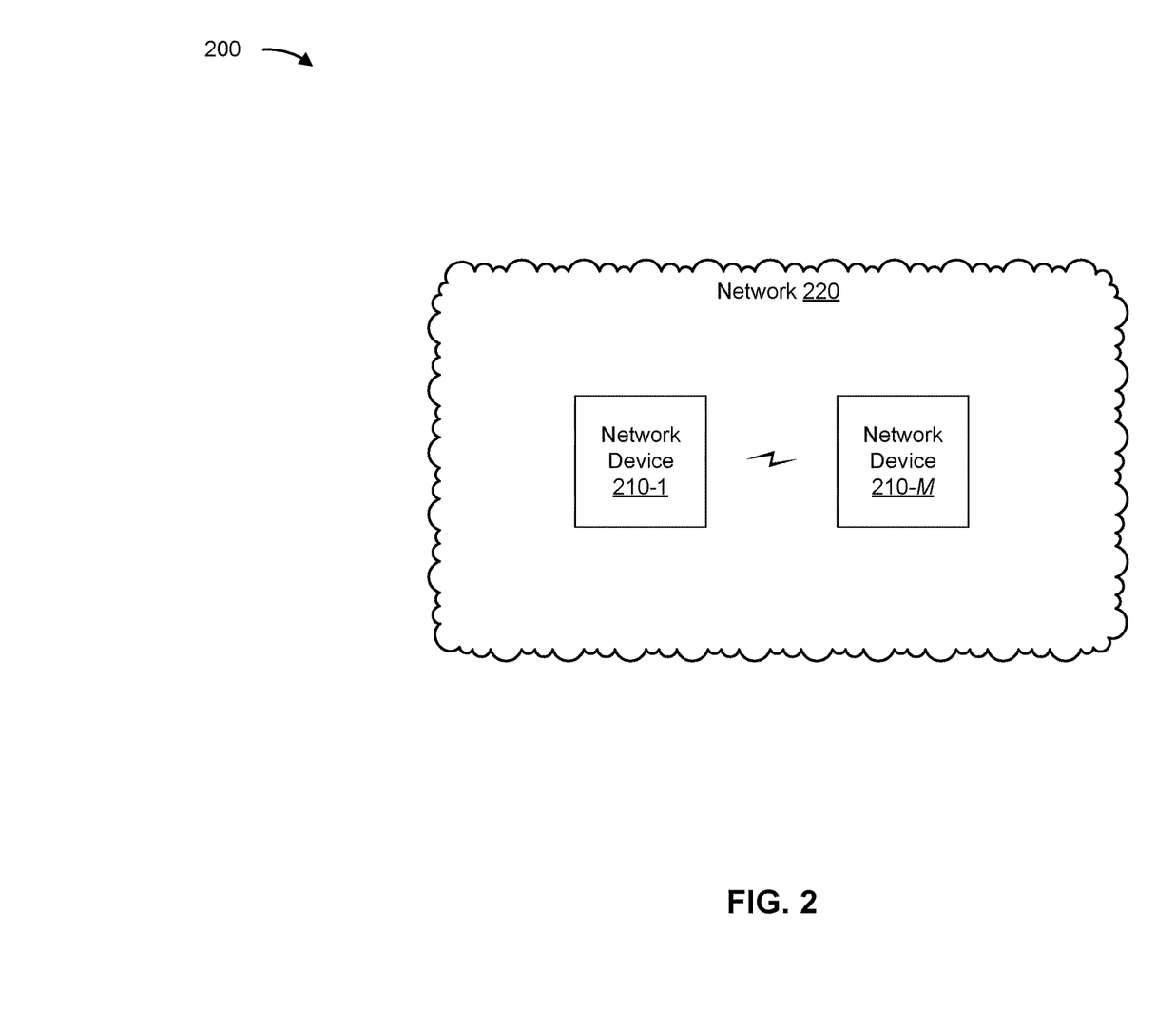
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include network devices 210 (shown as network device 210-1 through network device 210-M) and a network 220. Devices of environment 200 may interconnect via wired connections, wireless connections, or a combination of wired and wireless connections.

Network device 210 includes one or more devices capable of receiving, processing, storing, routing, and/or providing traffic (e.g., that includes one or more messages) in a manner described herein. For example, network device 210 may include a router, such as a label switching router (LSR), a label edge router (LER), an ingress router, an egress router, a provider router (e.g., a provider edge router or a provider core router), a virtual router, or another type of router. Additionally, or alternatively, network device 210 may include a gateway, a switch, a firewall, a hub, a bridge, a reverse proxy, a server (e.g., a proxy server, a cloud server, or a data center server), a load balancer, and/or a similar device. In some implementations, network device 210 may be a physical device implemented within a housing, such as a chassis. In some implementations, network device 210 may be a virtual device implemented by one or more computer devices of a cloud computing environment or a data center. In some implementations, a group of network devices 210 may be a group of data center nodes that are used to route traffic flow through network 220. In some implementations, two network device devices may be connected via a LAG that includes a plurality of links.

Network 220 includes one or more wired and/or wireless networks. For example, network 220 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
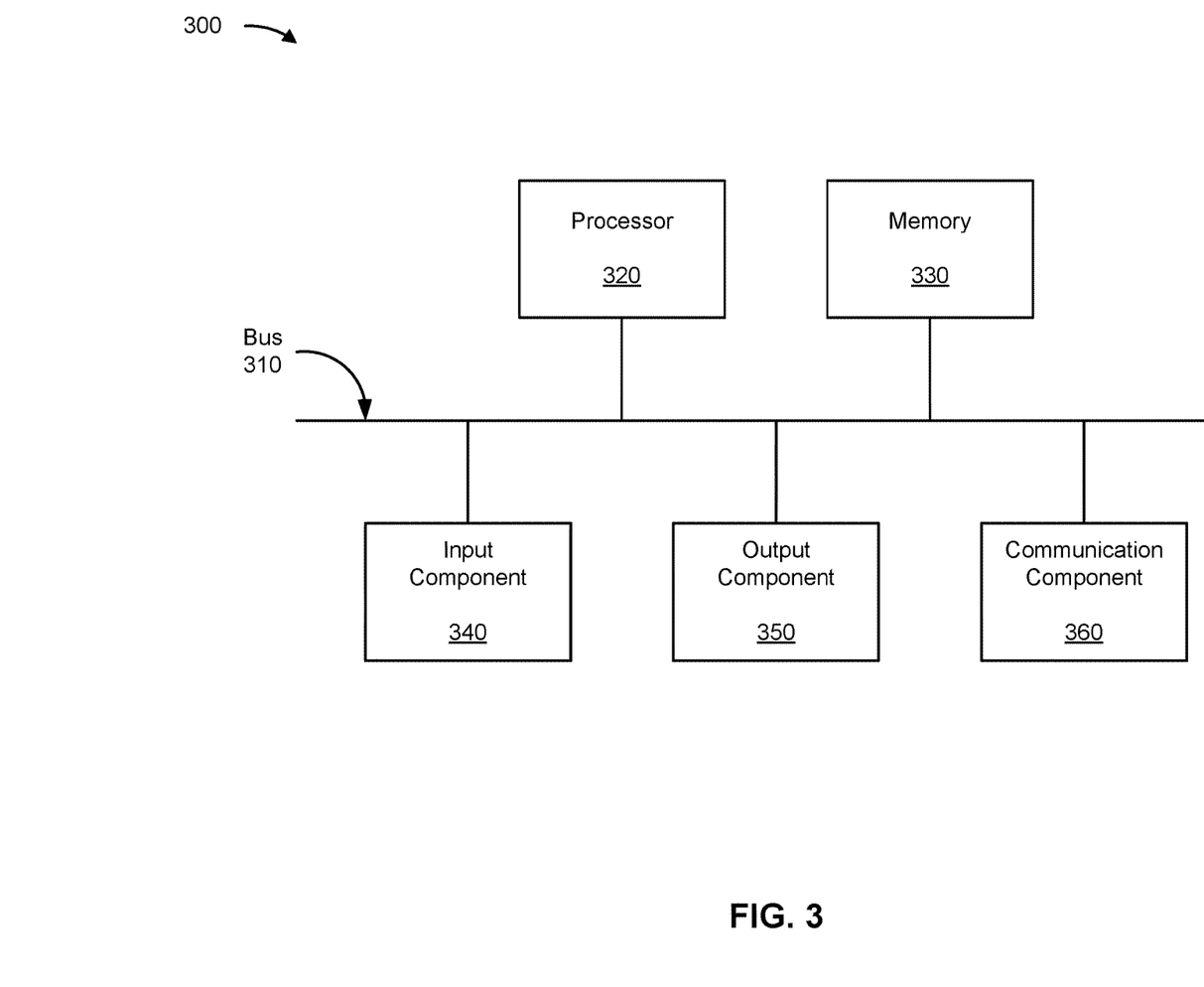
FIG. 3 is a diagram of example components of a device described herein.

FIG. 3 is a diagram of example components of a device 300 associated with enabling PTP over a LAG using LACP parameters. The device 300 may correspond to network device 210. In some implementations, network device 210 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
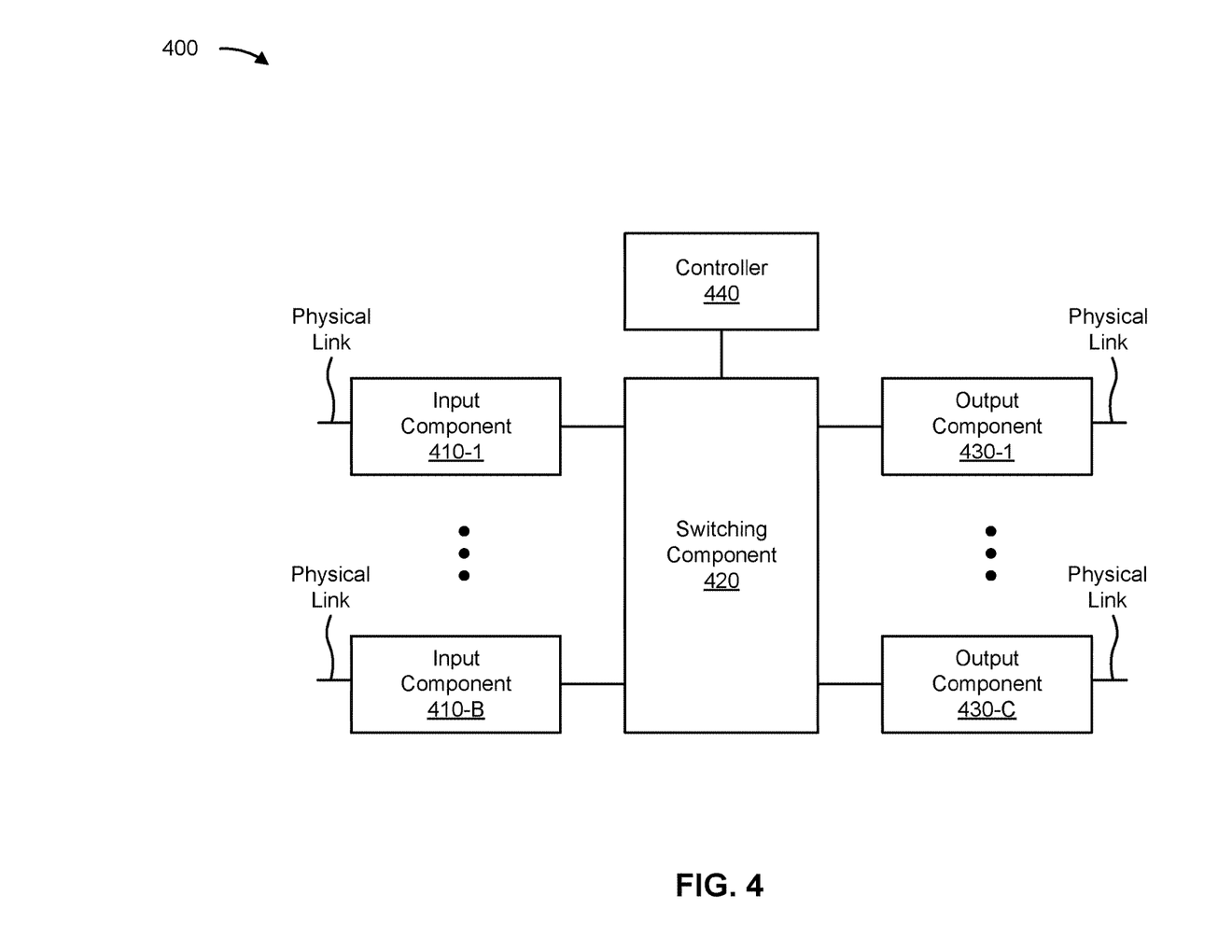
FIG. 4 is a diagram of example components of a device described herein.

FIG. 4 is a diagram of example components of a device 400 associated with enabling PTP over a LAG using LACP parameters. Device 400 may correspond to network device 210. In some implementations, network device 210 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
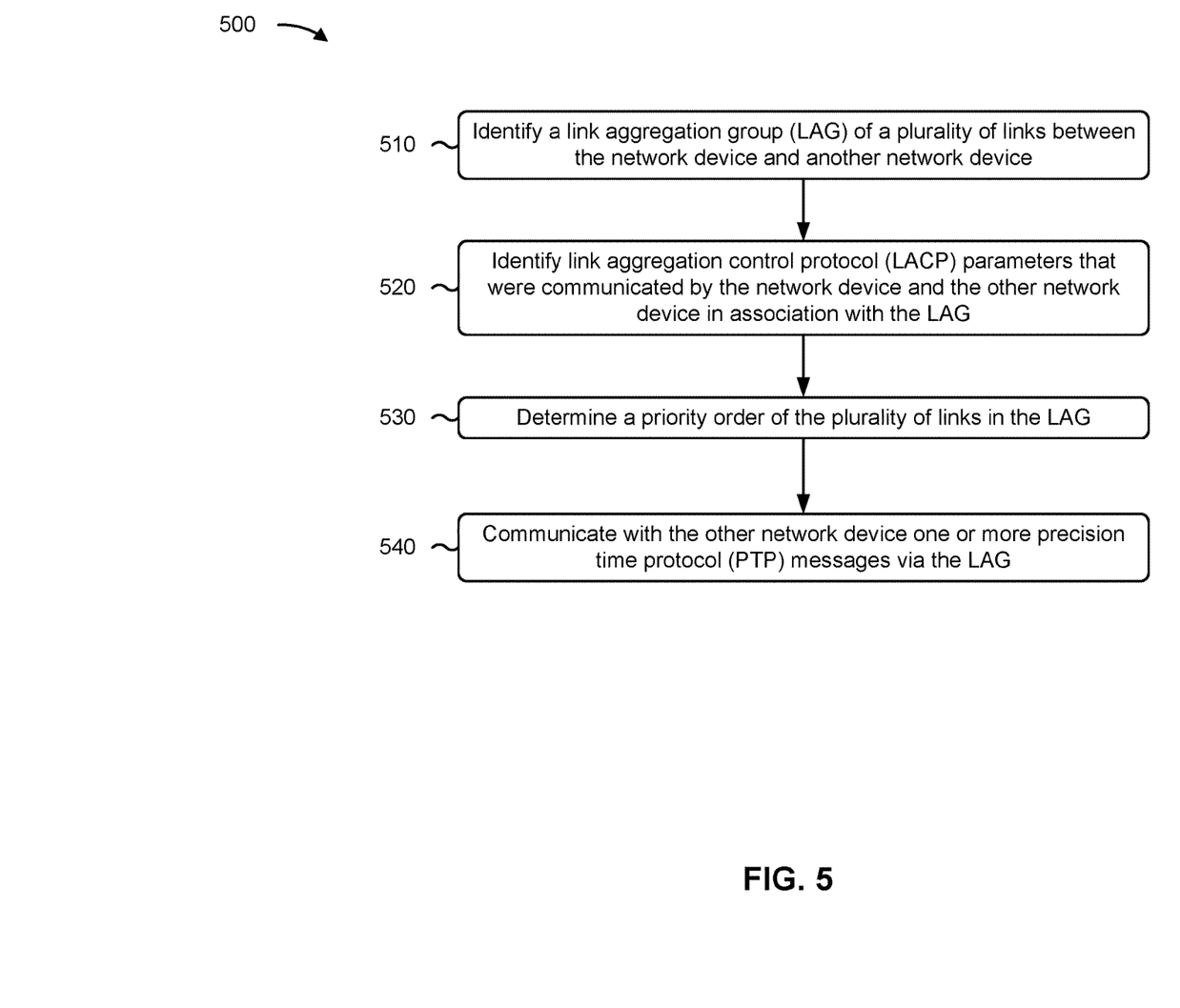
FIG. 5 is a flowchart of an example process associated with enabling PTP over a LAG using LACP parameters.

FIG. 5 is a flowchart of an example process 500 associated with enabling PTP over a LAG using LACP parameters. In some implementations, one or more process blocks of FIG. 5 are performed by a network device (e.g., network device 210). In some implementations, one or more process blocks of FIG. 5 are performed by another device or a group of devices separate from or including the network device, such as another network device. Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output components 430, and/or controller 440; and/or one or more other components.

As shown in FIG. 5, process 500 may include identifying a LAG of a plurality of links between the network device and another network device (block 510). For example, the network device may identify a LAG of a plurality of links between the network device and another network device, as described above.

As further shown in FIG. 5, process 500 may include identifying LACP parameters that were communicated by the network device and the other network device in association with the LAG (block 520). For example, the network device may identify LACP parameters that were communicated by the network device and the other network device in association with the LAG, as described above.

As further shown in FIG. 5, process 500 may include determining a priority order of the plurality of links in the LAG (block 530). For example, the network device may determine, based on the LACP parameters, a priority order of the plurality of links in the LAG, as described above.

As further shown in FIG. 5, process 500 may include communicating with the other network device one or more PTP messages via the LAG (block 540). For example, the network device may communicate with the other network device, and based on the priority order of the plurality of links of the LAG, one or more PTP messages via the LAG, as described above.

Process 500 may include additional implementations, such as any single implementation or any combination of implementations described below and/or in connection with one or more other processes described elsewhere herein.

In a first implementation, the plurality of links includes at least three links, and the priority order of the plurality of links identifies a respective priority for each link of the plurality of links.

In a second implementation, alone or in combination with the first implementation, the LACP parameters indicate, for a link, of the plurality of links of the LAG a first port key identifier, originated by the network device, that indicates the LAG, a first port number, originated by the network device, that indicates a port of the network device associated with the link, a second port key identifier, originated by the other network device, that indicates the LAG, and a second port number, originated by the other network device, that indicates a port of the other network device associated with the link.

In a third implementation, alone or in combination with one or more of the first and second implementations, determining the priority order of the plurality of links of the LAG comprises identifying, based on the LACP parameters, a port key identifier that indicates the LAG; identifying, based on the LACP parameters and the port key identifier, a plurality of port numbers that indicate a plurality of ports of the network device that are respectively associated with the plurality of links of the LAG; determining, using a sorting technique, a sequence of the plurality of port numbers; and determining, based on the sequence of the plurality of port numbers, the priority order of the plurality of links of the LAG.

In a fourth implementation, alone or in combination with one or more of the first through third implementations, determining the priority order of the plurality of links of the LAG comprises identifying, based on the LACP parameters, a port key identifier that indicates the LAG; identifying, based on the LACP parameters and the port key identifier, a plurality of port numbers that indicate a plurality of ports of the other network device that are respectively associated with the plurality of links of the LAG; determining, using a sorting technique, a sequence of the plurality of port numbers; and determining, based on the sequence of the plurality of port numbers, the priority order of the plurality of links of the LAG.

In a fifth implementation, alone or in combination with one or more of the first through fourth implementations, the LACP parameters indicate, for a link, of the plurality of links of the LAG, a first port number, originated by the network device, that indicates a port of the network device associated with the link; a first port priority, originated by the network device, that indicates a priority of the port of the network device; a second port number, originated by the other network device, that indicates a port of the other network device associated with the link; and a second port priority, originated by the network device, that indicates a priority of the port of the other network device.

In a sixth implementation, alone or in combination with one or more of the first through fifth implementations, determining the priority order of the plurality of links of the LAG comprises identifying, based on the LACP parameters, a plurality of port numbers that indicate a plurality of ports of the network device that are respectively associated with the plurality of links of the LAG; identifying, based on the LACP parameters, a plurality of port priorities that indicate respective priorities of the plurality of ports of the network device; determining, based on the plurality of port priorities that indicate the respective priorities of the plurality of ports of the network device, a sequence of the plurality of port numbers; and determining, based on the sequence of the plurality of port numbers, the priority order of the plurality of links of the LAG.

In a seventh implementation, alone or in combination with one or more of the first through sixth implementations, determining the priority order of the plurality of links of the LAG comprises identifying, based on the LACP parameters, a plurality of port numbers that indicate a plurality of ports of the other network device that are respectively associated with the plurality of links of the LAG; identifying, based on the LACP parameters, a plurality of port priorities that indicate respective priorities of the plurality of ports of the other network device; determining, based on the plurality of port priorities that indicate the respective priorities of the plurality of ports of the other network device, a sequence of the plurality of port numbers; and determining, based on the sequence of the plurality of port numbers, the priority order of the plurality of links of the LAG.

In an eighth implementation, alone or in combination with one or more of the first through seventh implementations, communicating the one or more PTP messages via the LAG comprises determining that a first link, of the plurality of links of the LAG, with a primary priority in the priority order is not available; determining that a second link, of the plurality of links of the LAG, with a secondary priority in the priority order is not available; determining, based on determining that the first link is not available and the second link is not available, that a third link, of the plurality of links of the LAG, with a tertiary priority in the priority order is available; and communicating, based on determining that the third link is available, the one or more PTP messages via the third link.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
identifying, by a network device, a link aggregation group (LAG) of a plurality of links between the network device and another network device;
identifying, by the network device, link aggregation control protocol (LACP) parameters that were communicated by the network device and the other network device in association with the LAG,
wherein the LACP parameters are stored as entries in a data structure, each entry includes an identifier associated with a link, a first port number of the network device, a first key identifier that indicates that a plurality of first ports of the network device are associated with the LAG, a second port number of the other network device that is related to the link, and a second key identifier that indicates a plurality of second ports of the other network device are associated with the LAG;
determining, by the network device, based on the LACP parameters of the data structure, and independently from a second priority order determined by the other network device, a first priority order of the plurality of first ports,
wherein the second priority order is related to the plurality of second ports,
wherein the LACP comprises state information and compares the state information to information associated with the other network device to determine that the other network device received correct information associated with the network device, and
wherein the second priority order is determined by the other network device based on the LACP parameters of the data structure, independently from the first priority order determined by the network device;
determining, by the network device and the other network device, based on the first priority order and after the first priority order and the second priority order are determined independently, a priority order of the plurality of links of the LAG; and
communicating, by the network device, with the other network device, based on the priority order of the plurality of links of the LAG, one or more precision time protocol (PTP) messages via the LAG.

2. The method of claim 1, wherein the plurality of links includes at least three links, and the priority order of the plurality of links identifies a respective priority for each link of the plurality of links.

3. The method of claim 1, wherein determining the priority order of the plurality of links of the LAG comprises:
determining, using a sorting technique, a sequence of the plurality of first ports; and
determining, based on the sequence of the plurality of first ports, the priority order of the plurality of links of the LAG.

4. The method of claim 1, further comprising:
determining LACP state and role information for the plurality of links of the LAG.

5. The method of claim 1, wherein determining the priority order of the plurality of links of the LAG comprises:
determining, a sequence of the plurality of first ports.

6. The method of claim 1, wherein LACP messages are exchanged in association with maintaining the LAG.

7. The method of claim 1, wherein communicating the one or more PTP messages via the LAG comprises:
determining that a first link, of the plurality of links of the LAG, with a primary priority in the priority order is not available;
determining that a second link, of the plurality of links of the LAG, with a secondary priority in the priority order is not available;
determining, based on determining that the first link is not available and the second link is not available, that a third link, of the plurality of links of the LAG, with a tertiary priority in the priority order is available; and
communicating, based on determining that the third link is available, the one or more PTP messages via the third link.

8. A non-transitory computer-readable medium storing a set of instructions, the set of instructions comprising:
one or more instructions that, when executed by one or more processors of a network device and one or more processors of another network device, cause at lest one of the netowrk device and the other network device to:
identify, by the network device, link aggregation control protocol (LACP) parameters associated with a link aggregation group (LAG) of a plurality of links between the network device and the other network device,
wherein the LACP parameters are stored as entries in a data structure, each entry includes an identifier associated with a link, a first port number of the network device, a first key identifier that indicates that a plurality of first ports of the network device are associated with the LAG, a second port number of the other network device that is related to the link, and a second key identifier that indicates a plurality of second ports of the other network device are associated with the LAG;
determine, by the network device, based on the LACP parameters of the data structure, and independently from a second priority order determined by the other network device, a first priority order of the plurality of first ports,
wherein the second priority order is related to the plurality of second ports,
wherein the LACP comprises state information and compares the state information to information associated with the other network device to determine that the other network device received correct information associated with the network device, and
wherein the second priority order is determined by the other network device based on the LACP parameters of the data structure, independently from the first priority order determined by the network device;
determine, by the network device and the other network device, based on the first priority order and after the first priority order and the second priority order are determined independently, a priority order of the plurality of links of the LAG; and
communicate, by the network device, with the other network device, based on the priority order of the plurality of links of the LAG, one or more precision time protocol (PTP) messages via the LAG.

9. The non-transitory computer-readable medium of claim 8, wherein the one or more instructions, that cause the network device to determine the priority order of the plurality of links of the LAG, cause the network device to:
determine a sequence of the plurality of first ports.

10. The non-transitory computer-readable medium of claim 8, wherein the one or more instructions further cause the network device to:
> determine LACP state and role information for the plurality of links of the LAG.

11. The non-transitory computer-readable medium of claim 8, wherein the one or more instructions, that cause the network device to communicate the one or more PTP messages via the LAG, cause the network device to:
> determine that a first link, of the plurality of links of the LAG, with a primary priority in the priority order is not available;
> determine that a second link, of the plurality of links of the LAG, with a secondary priority in the priority order is not available;
> determine, based on determining that the first link is not available and the second link is not available, that a third link, of the plurality of links of the LAG, with a tertiary priority in the priority order is available; and
> communicate, based on determining that the third link is available, the one or more PTP messages via the third link.

12. The non-transitory computer-readable medium of claim 10, wherein the one or more instructions, that cause the network device to determine the priority order of the plurality of links of the LAG, cause the network device to:
> determine, using a sorting technique, a sequence of the plurality of first ports; and
> determine, based on the sequence of the plurality of first ports, the priority order of the plurality of links of the LAG.

13. The non-transitory computer-readable medium of claim 8, wherein LACP messages are exchanged in association with maintaining the LAG.

14. The non-transitory computer-readable medium of claim 8, wherein the plurality of links includes at least three links, and the priority order of the plurality of links identifies a respective priority for each link of the plurality of links.

15. A network device, comprising:
> one or more memories; and
> one or more processors to:
>> identify a link aggregation group (LAG) of a plurality of links between the network device and another network device;
>> identify link aggregation control protocol (LACP) parameters that were communicated by the network device and the other network device in association with the LAG,
>>> wherein the LACP parameters are stored as entries in a data structure, each entry includes an identifier associated with a link, a first port number of the network device, a first key identifier that indicates that a plurality of first ports of the network device are associated with the LAG, a second port number of the other network device that is related to the link, and a second key identifier that indicates a plurality of second ports of the other network device are associated with the LAG;
>> determine based on the LACP parameters of the data structure, and independently from a second priority order determined by the other network device, a first priority order of the plurality of first ports,
>>> wherein the second priority order is related to the plurality of second ports,
>>> wherein the LACP comprises state information and compares the state information to information associated with the other network device to determine that the other network device received correct information associated with the network device, and
>>> wherein the second priority order is determined by the other network device based on the LACP parameters of the data structure, independently from the first priority order determined by the network device;
>> determine, by the network device and the other network device, based on the first priority order and after the first priority order and the second priority order are determined independently, a priority order of the plurality of links of the LAG; and
>> communicate with the other network device, based on the priority order of the plurality of links of the LAG, one or more precision time protocol (PTP) messages via the LAG.

16. The network device of claim 15, wherein the plurality of links includes at least three links, and the priority order of the plurality of links identifies a respective priority for each link of the plurality of links.

17. The network device of claim 15, wherein the one or more processors, when determining the priority order of the plurality of links of the LAG, are to:
> determine, using a sorting technique, a sequence of the plurality of first ports; and
> determine, based on the sequence of the plurality of first ports, the priority order of the plurality of links of the LAG.

18. The network device of claim 15, wherein the one or more processors are further to:
> determine LACP state and role information for the plurality of links of the LAG.

19. The network device of claim 15, wherein the one or more processors, when determining the priority order of the plurality of links of the LAG, are to:
> determine a sequence of the plurality of first ports.

20. The network device of claim 15, wherein LACP messages are exchanged in association with maintaining the LAG.

\* \* \* \* \*